Aug. 8, 1933.  C. J. SMITH  1,921,266
ENGINE
Filed May 26, 1930  2 Sheets-Sheet 1

Aug. 8, 1933.  C. J. SMITH  1,921,266
ENGINE
Filed May 26, 1930  2 Sheets-Sheet 2
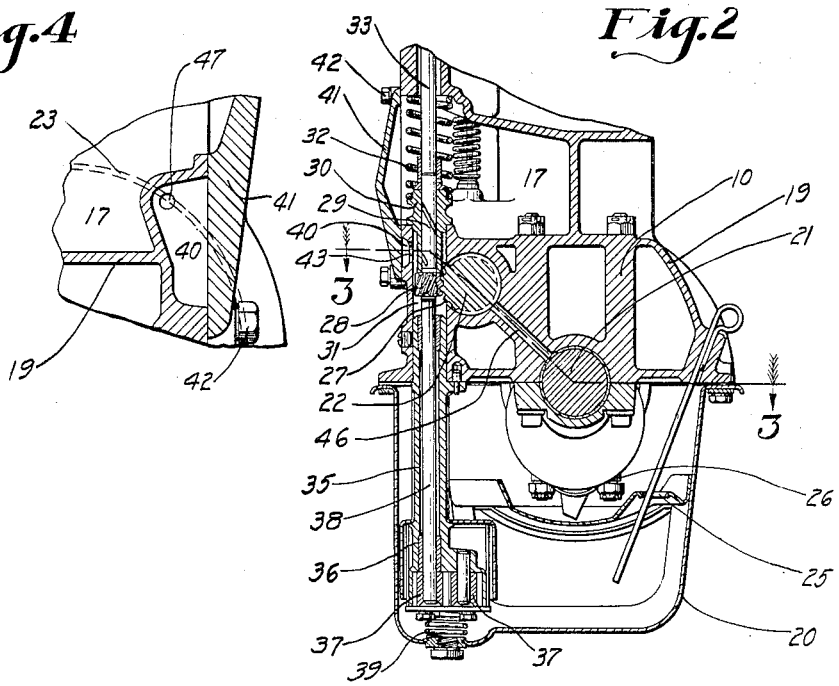
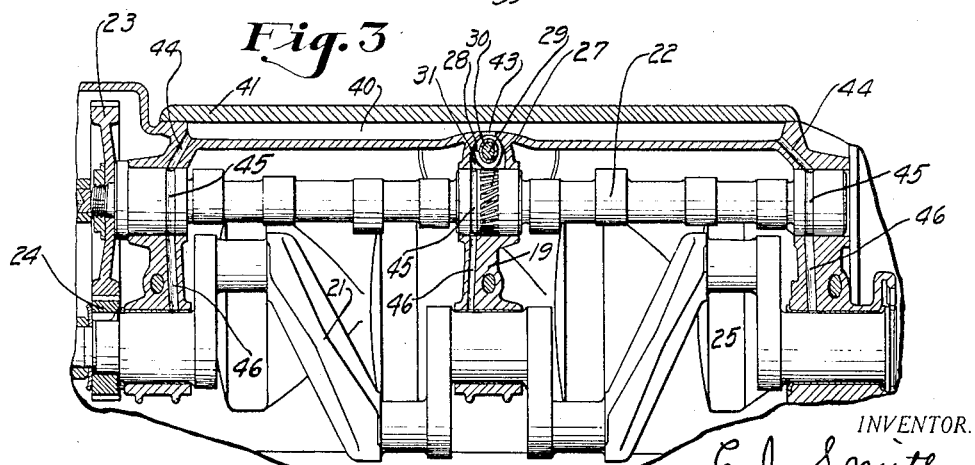
Witness
E. C. McRae
INVENTOR.
C. J. Smith
BY
E. L. Davis
ATTORNEY.

Patented Aug. 8, 1933

1,921,266

UNITED STATES PATENT OFFICE 1,921,266

ENGINE

Charles J. Smith, Dearborn, Mich., assignor to Ford Motor Company, Dearborn, Mich., a Corporation of Delaware Application May 26, 1930. Serial No. 455,548

7 Claims. (Cl. 184—6)

The object of my invention is to provide improvements in an engine oiling system of simple, durable and inexpensive construction.

A further object of my invention is to provide an engine oiling system wherein lubricant is forced under pressure to both the cam shaft and crank shaft bearings to thereby properly lubricate these important parts of the engine.

More particularly my invention consists in providing an engine having an oil manifold extending horizontally in the upper part of the crank case from which manifold a plurality of conduits are drilled to conduct the oil through the engine block casting to the various bearings. In my improved structure a novel method is used to obtain the oil manifold. A horizontal groove or channel is cast in the engine crank case just below the valve chamber and the valve chamber cover plate is secured over both this chamber and the horizontal channel to thereby form a horizontal manifold extending the length of the engine block.

Still a further object of my invention is to provide a metered outlet port in one end of this manifold which will discharge the surplus oil over the timing gears of the engine. This metered port is so proportioned that in cold weather when the oil is very viscous the oil pressure in the manifold will be increased to thereby increase the pressure forcing the oil to the engine bearings. After the motor has warmed up and the oil has become fluid, the pressure in the manifold automatically lowers due to the easier flow of oil through the metered port. This feature insures oil for the bearings when starting without the disadvantage of maintaining this high pressure during normal operation.

A further feature and one of primary importance in connection with this device is the provision whereby all of the conduits extending from the oil manifold to the bearings are drilled in the casting so that all fittings, tubes, or connections threaded into the oiling system, or pipes cast in the cylinder block are eliminated. This results in a considerable saving in the manufacturing cost of the engine where fittings were formerly used and further, simplifies the casting of the block where tubes were formerly cast therein.

Further, the forming of my oil manifold by casting a groove in the side of the cylinder block over which the valve chamber cover plate is disposed to thereby form a closed chamber, is believed to be new in this art. This construction allows the oil manifold to be readily cleaned each time the valve chamber cover plate is removed so that the possibility of dirt accumulating in this manifold is practically eliminated.

With these and other objects in view my invention consists in the arrangement, construction and combination of the various parts of my improved device, as described in my specification, claimed in my claims, and illustrated in the accompanying drawings, in which:

Figure 2 shows a vertical central sectional view through the lower portion of my improved engine, such as is shown in Figure 1.

Figure 3 shows a sectional view taken on the line 3—3 of Figure 2, and

Figure 4 shows a sectional view taken on the line 4—4 of Figure 1.

Figure 1:
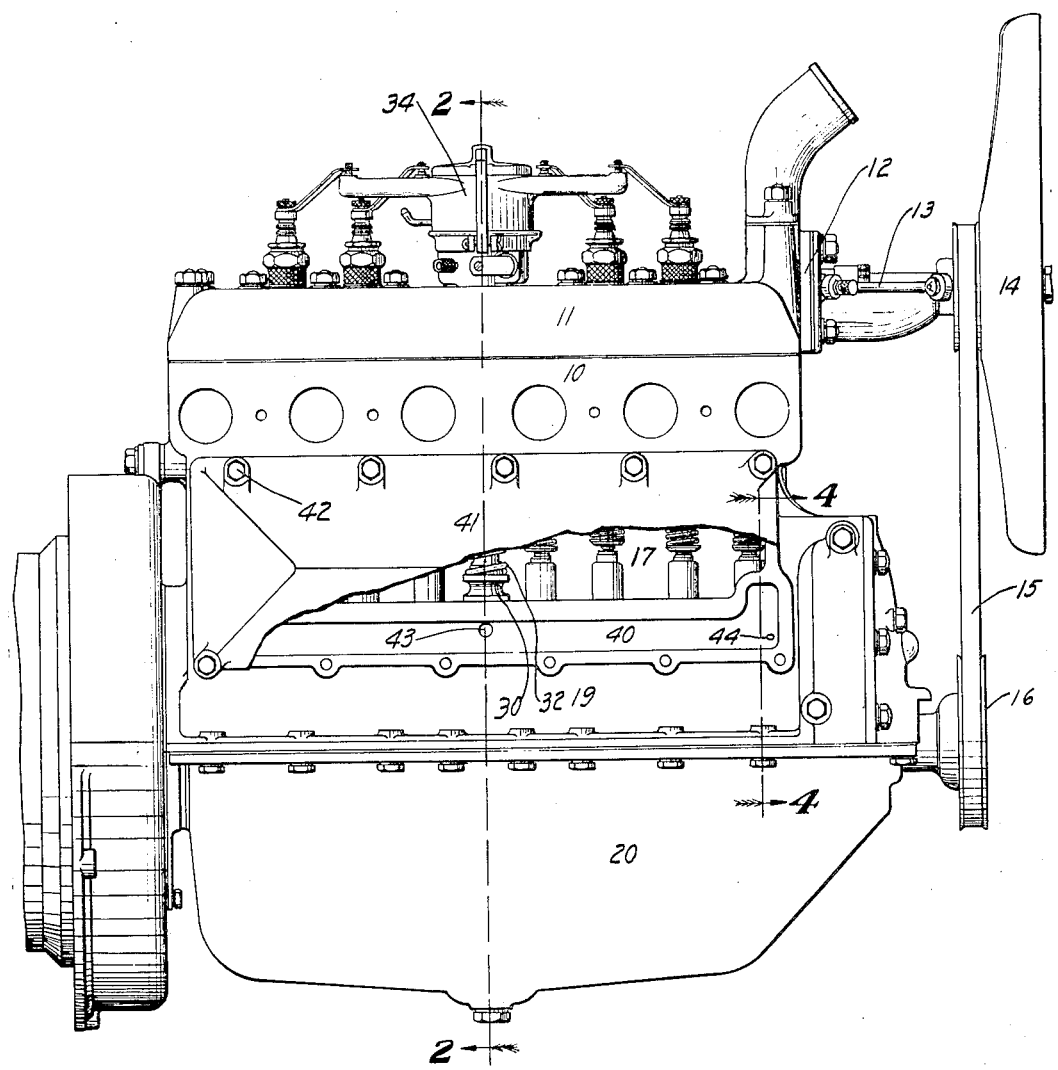
Figure 1 shows a side elevation of my improved engine, part of the valve chamber cover being broken away to better illustrate the construction.

Referring to the accompanying drawings, I have used the reference numeral 10 to designate a cylinder block of the conventional four cylinder type. A cylinder head 11 is secured over the top of the block 10, which head is provided with a water pump 12, the driving shaft 13 for which is provided with a fan 14 secured to the forward end thereof and which is driven by a fan belt 15 from the crank shaft pulley 16.

This engine is designed to operate as an "L" head motor and is therefore provided with a valve chamber 17 in which the valves, valve bushings and valve springs are disposed. The valve chamber 17 extends the length of the cylinder block between a conventional crank case 19, formed integrally with the lower portion of the block, and the upper portion of the cylinder block so that the valves and valve springs may be readily accessible. An oil pan 20 is secured to the under side of the crank case 19 and forms the enclosure in which an engine crank shaft 21 is rotatably mounted. It will be noted from Figure 3 that the crank shaft 21 is only provided with three main bearings, one at each end and one in the center, but it will be understood that the invention herein disclosed is applicable to crank shafts having any number of bearings.

I have provided a three bearing cam shaft 22 which is rotatably mounted in the crank case 19 parallel to the crank shaft 21 upon one end of which a timing gear 23 is secured, which gear meshes with a crank shaft gear 24 secured to the forward end of the crank shaft so as to drive the cam shaft in synchronism therewith. A dip trough 25 is secured to the intermediate portion of the oil pan 20 and is proportioned so that the lower ends of connecting rods 26 dip up oil from this trough to lubricate the connecting rod bearings. That portion of the oil pan below the dip trough 25 forms an oil reservoir for retaining the engine oil.

The center bearing of the cam shaft 22 is provided with an annulus of gear teeth 27 arranged to mesh with a spiral gear 28, the axis of which extends in a vertical direction. The gear 28 is formed integrally with one end of a shaft 29 which is rotatably mounted in a bearing 30, the latter being piloted in a vertical bore 31 extending from top to bottom through the center portion of the cylinder block and crank case. A coil spring 32 is arranged to resiliently hold the bearing 30 in that portion of the bore 31 formed in the bottom of the valve chamber 17 so that the gears 27 and 28 are in constant mesh. A distributor shaft 33 is rotatably mounted in the upper portion of the bore 31 and is connected to the upper end of the shaft 29 and extends to position to drive the rotor of distributor 34 which is mounted upon the cylinder head 11.

An oil pump assembly is provided which consists of a vertical tubular member 35, the upper end of which is piloted by the lower end of the bore 31 and the lower end of which is formed to provide an oil pump housing 36. The housing 36 is provided with a pair of meshed gears 37, rotatably mounted therein, one of which is directly connected to a pump shaft 38 which shaft extends up through the tube 35 and connects with the lower portion of the gear 28. The housing 36 is disposed in the lower portion of the oil pan 20 so as to be submerged in oil and is held in place by a coil spring 39 which constantly urges the upper end of the tube 35 into the opening 31.

It may thus be seen that I have provided a substantially continuous shaft extending vertically from the distributor 34 to the oil pump 36, which shaft is driven in synchronism with the cam shaft 22.

A considerable space or clearance is allowed between the shaft 38 and the tube 35 which serves as an oil conduit. The discharge port from the pump 36 is arranged to conduct the oil into the bottom of this space where it will be forced upwardly into the bore 31. The gears 27 and 28 operating in this bore are thereby flooded with oil to insure proper lubrication thereof.

I have provided a horizontal channel 40 cast in the crank case 19 just below the valve chamber 17 which extends the full length of the chamber and a valve chamber cover plate 41 is secured over both the valve chamber 17 and the channel 40 by a plurality of cap screws 42 so that the channel 40 co-acting with the lower portion of this cover plate 41 forms a horizontal conduit which extends the length of the cylinder block. An opening 43 is drilled through the bottom of the channel 40 into the vertical opening 31 so that the oil under pressure in this opening will be conducted into the channel 40.

Referring to Figures 2 and 3, I have shown drilled conduits for conducting the lubricant from the channel 40 to all of the cam shaft and crank shaft main bearings. A conduit 44 is drilled from each end of the channel 40 through the crank case 19 to the adjacent cam shaft bearing so that the oil under pressure in the channel will be forced to these bearings. The center cam shaft bearing is flooded with oil from the bore 31 so that no conduit need be drilled to this bearing. Those portions of the cam shaft forming the three bearings are each provided with an annular groove 45 aligned with the opening 43 and bore 31 so that oil may flow freely around these bearings.

The means for conducting the lubricant to the crank shaft main bearings consists of conduits 46 drilled from the under side of the crank case through the upper half of each main bearing to the cam shaft bearings where they are aligned with the grooves 45. The lubricant is thereby conducted from the channel 40 first to the cam shaft bearings and then to the main bearings of the crank shaft.

Referring to Figure 4, I have provided a metered opening 47 in the wall forming the forward end of the channel 40, which opening discharges excess lubricant onto the timing gear 23, which is illustrated by dotted lines 47. This opening is so metered that when the oil in the engine is cold and viscous its discharge therethrough will be restricted to an extent sufficient to produce a high pressure in the channel 40 and conduits 44 and 46 to thereby insure positive lubrication for the bearings. However, when the oil warms up and consequently becomes thinner, its flow through the opening 47 is less restricted so that the oil pressure in the system is automatically reduced. In this way I am enabled to force the cold oil under a high pressure to the bearings when the motor is being started, which pressure is reduced after the motor warms up and at which time very little pressure is needed to force the oil to the bearings.

Some deviations may be made from the specific structure shown herein which to those skilled in the art will be readily apparent. The channel 40 may be machined or cast in the cover plate 41 in which case the engine block may be provided with only a flat co-acting surface to form the oil manifold. Further, a separate plate may be provided which may co-act with the engine casting independently of the valve chamber cover plate, such structure being particularly applicable to over-head valve engines.

Many advantages arise through the use of my improved device among which it may be well to mention that I have provided a means for supplying force feed oil to all of the cam shaft and crank shaft bearings without the use of any tubes, fittings, or pipes cast in the engine. Further, I have formed an oil manifold which may be readily cleaned or inspected in a simple manner. This conduit system adds no parts to the motor so that the commercial advantage of this structure is apparent.

Further, my metered discharge port provides an automatic means for regulating the oil pressure so that a high oil pressure will be maintained when the oil is cold and viscous which pressure will be reduced as the temperature of the oil increases.

Further, the absence of tubes, fittings or the like eliminates the possibility of an oil line being broken, either accidentally or through excessive pressure, so that the motor is more positively protected against failure from this cause.

Some changes may be made in the arrangement, construction, and combination of the various parts of my improved device without departing from the spirit of my invention, and it is my intention to cover by claims, such changes as may reasonably be included within the scope thereof.

I claim as my invention:

1. An internal combustion engine having an outwardly opening valve spring chamber formed therein, and a cover plate detachably secured over said chamber opening forming a closure therefore, said cover plate extending a substantial distance over one edge of said opening with said extended portion of the cover plate and coacting portion of said engine characterized by having a channel formed therebetween, which channel functions in said engine as a pressure resisting oil conduit.

2. An engine, as claimed in claim 1, wherein said chamber is cast in position extending along one side of a vertical cylinder block casting.

3. An engine, as claimed in claim 1, wherein said valve chamber comprises a rectangular-shaped chamber formed in and extending along one side of the engine casting and wherein said channel extends parallel to said chamber.

4. An engine, as claimed in claim 1, wherein said channel is formed in said engine and wherein said cover plate forms a substantially flat plate over said channel, for the purpose described.

5. An internal combustion engine having an outwardly opening valve spring chamber formed therein, and a cover plate detachably secured over said chamber opening, said cover plate extending a substantial distance over one edge of said opening, and said engine having a channel formed therein beneath said extended portion of the cover plate, said cover plate being substantially flat and coacting with both edges of said channel and with the remaining edges of said valve chamber opening to both form a closure for said valve chamber and to form said channel into a pressure resisting conduit which is independent of said chamber.

6. An engine, as claimed in claim 5, wherein said valve chamber and oil channel are both cast in the engine cylinder block.

7. An internal combustion engine comprising, an engine cylinder block having an outwardly opening valve spring chamber cast in one side thereof, said block having a channel cast therein in position parallel and adjacent to one of the edges of said valve spring chamber opening, the edges of said channel and valve spring chamber being machined flush, and a single cover plate detachably secured over said valve spring chamber to form a closure for said chamber, and over said cover plate coacting with both edges of said channel to form a pressure resisting oil conduit independently of said valve spring chamber.

CHARLES J. SMITH.